(12) United States Patent
Kish, Jr.

(10) Patent No.: US 7,131,632 B2
(45) Date of Patent: Nov. 7, 2006

(54) MICROFLUIDIC TWO-WAY ISOLATION VALVE

(75) Inventor: Walter J. Kish, Jr., Las Vegas, NV (US)

(73) Assignee: Kloehn Co., Ltd., Las Vegas, NV (US)

( * ) Notice: Subject to any disclaimer, the term of this patent is extended or adjusted under 35 U.S.C. 154(b) by 76 days.

(21) Appl. No.: 10/917,025

(22) Filed: Aug. 11, 2004

(65) Prior Publication Data
US 2005/0040357 A1    Feb. 24, 2005

Related U.S. Application Data

(60) Provisional application No. 60/496,440, filed on Aug. 18, 2003.

(51) Int. Cl.
*F16K 31/02* (2006.01)
(52) U.S. Cl. .......................... 251/129.15; 251/129.17; 251/129.18; 251/129.19
(58) Field of Classification Search ............................... 251/129.17–129.18
See application file for complete search history.

(56) References Cited

U.S. PATENT DOCUMENTS

| 6,415,818 | B1 | 7/2002 | Dickman et al. |
| 6,666,231 | B1 | 12/2003 | Entwistle |
| 6,941,963 | B1 * | 9/2005 | Maula et al. .................. 137/1 |
| 2002/0084435 | A1 * | 7/2002 | Fukano et al. ......... 251/129.17 |
| 2002/0107018 | A1 * | 8/2002 | Nakamura et al. .......... 455/433 |
| 2003/0107018 | A1 * | 6/2003 | Hettinger et al. ...... 251/129.19 |
| 2003/0155022 | A1 | 8/2003 | Weiss et al. |
| 2004/0046137 | A1 * | 3/2004 | Herbert et al. ......... 251/129.04 |

* cited by examiner

*Primary Examiner*—J. Casimer Jacyna
(74) *Attorney, Agent, or Firm*—Kenneth L. Sherman, Esq.; Vic Y. Lin, Esq.; Myers Dawes Andras & Sherman, LLP

(57) ABSTRACT

A solenoid-operated valve design and method particularly for suited for micro-fluidic applications are disclosed. The solenoid valve contains various structure and features that provide for small dispense volumes, small internal volume, and fast operating speed. Also disclosed is a valve design and method particularly suited for a compact, high-density valve manifold. In a particular embodiment disclosed, the valve uses a diaphragm assembly that ensures zero or little leakage. The solenoid-operated valve further has features allowing for low power consumption.

61 Claims, 4 Drawing Sheets

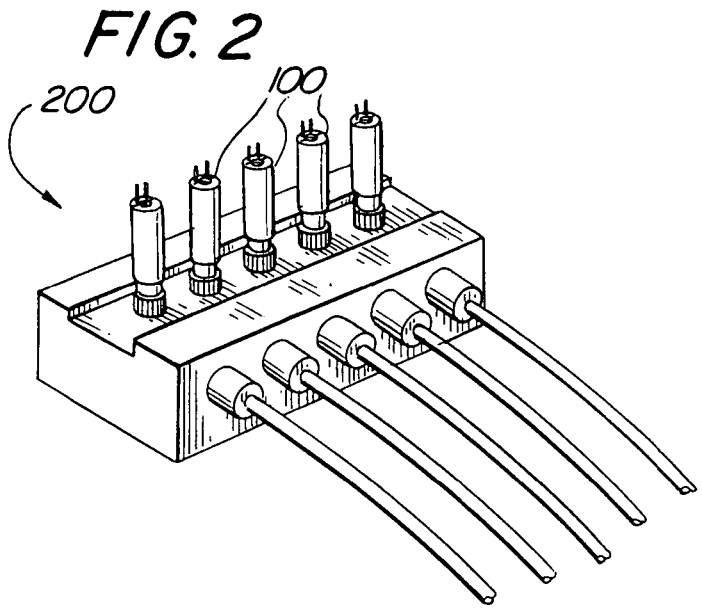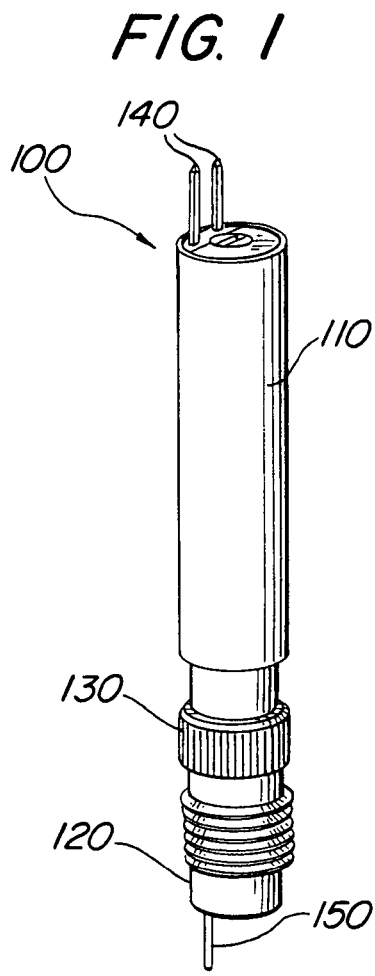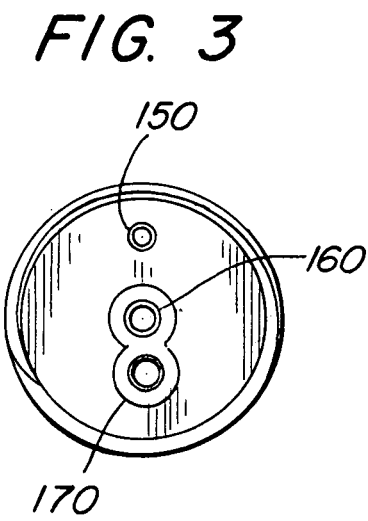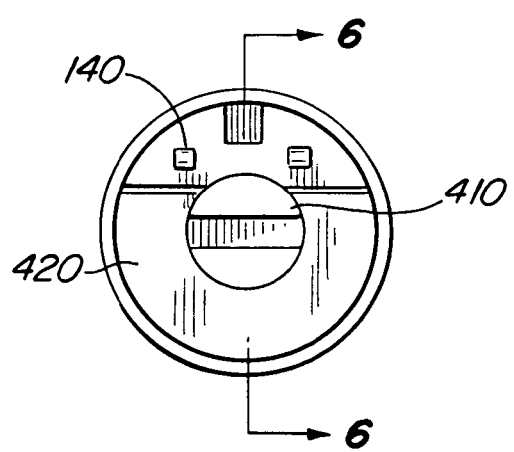

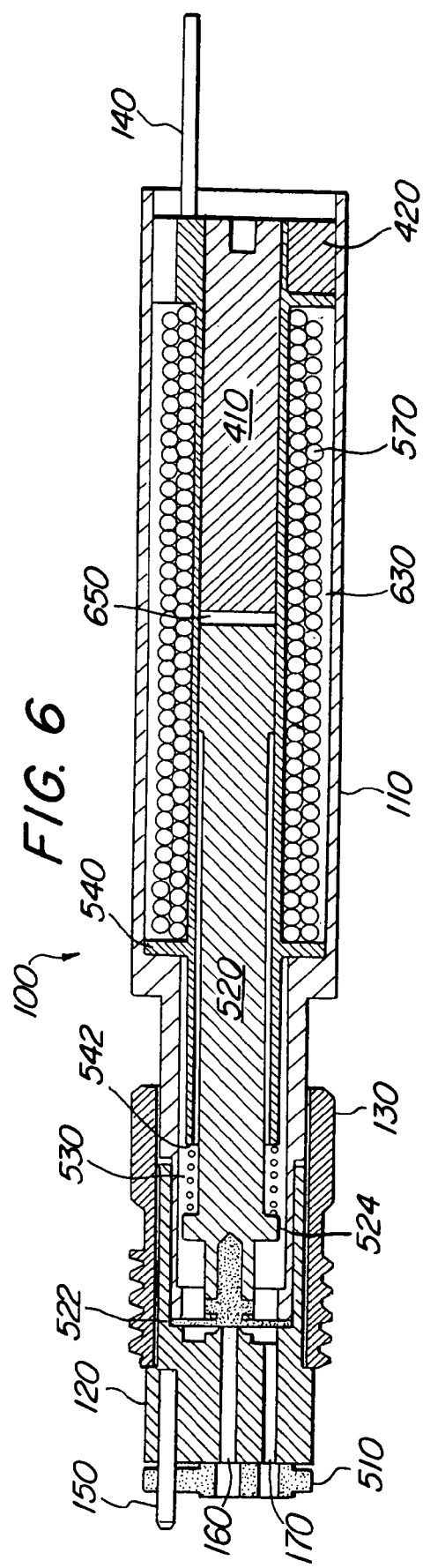
FIG. 6
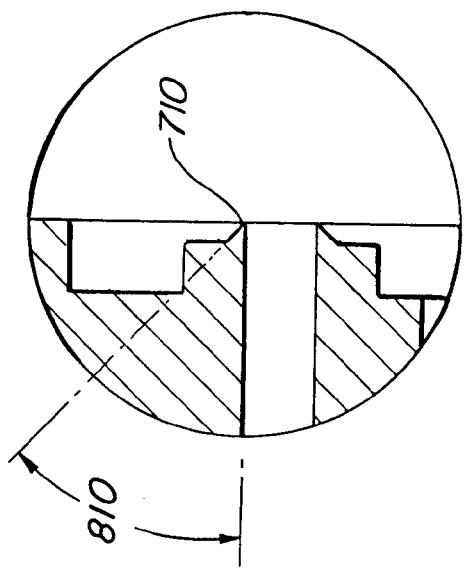
FIG. 8
FIG. 7

MICROFLUIDIC TWO-WAY ISOLATION VALVE

PRIORITY CLAIM

Priority is claimed from U.S. Provisional Patent Application Ser. No. 60/496,440, filed on Aug. 18, 2003 and entitled "Micro-Mini Two-Way Isolation Valve" pursuant to 35 USC §119, the entire contents of this provisional patent application are hereby expressly incorporated by reference.

BACKGROUND OF THE INVENTION

1. Field of the Invention

The present invention pertains generally to valves for physical transport and isolation of liquids and gases. More particularly, the present invention pertains to solenoid-operated isolation valves that are designed for low power and quick dispensing applications. The present invention, in a preferred embodiment, is particularly but not exclusively, useful as a solenoid-operated valve for micro-fluidic platforms with high-density manifolds, and method of manufacturing the same.

2. Description of the Prior Art

Solenoid-operated valves for isolation and transport of fluids are well known. An attractive characteristic of all solenoid-operated valves is that they can be remotely operated because electrical power is used to actuate the valve. Also, a solenoid valve is an attractive option when fluid systems require a valve to cycle open and shut, and thereby pass a set dispense volume of fluid. This is because solenoid valves use a generated and collapsing electromagnetic field to engage a valve stem or a plunger rod. Thus, a power supply can be easily cycled on and off to pass a particular amount of fluid. Solenoid valves are particularly useful in micro-fluidic applications.

Advancements in micro-fluidic arts such as blood chemistry analysis, drug discovery, DNA sequencing, liquid chromatography and other technical arts requiring precision fluid handling have created a need for progress in the components that control and dispense the fluids. Thus a need exists for a design and method for making and using a solenoid valve that provides for small dispensing volumes and can occupy a high density valve manifold with small fluidic components. Also, the nature of most micro-fluidic applications places importance on conserving a fluid sample. Therefore, a valve design and method having a zero "dead volume," and small internal volume is desired. Similarly, an isolation valve should be designed for zero leakage.

In addition, solenoid valve design and method that requires only a small power supply is desired for several reasons. One such reason is that a solenoid coil energized with a relatively high power supply incurs residual magnetism. Any residual magnetism affects the shut off speed of the valve and therefore the dispensed volume. Also, corrosion properties of materials used to fabricate valves are important. For instance, blood is a natural oxidizing agent and will cause some material to undergo pitting corrosion.

BRIEF SUMMARY OF THE INVENTION

In one aspect, a solenoid-operated valve comprises a fluid inlet, a fluid outlet, a coil housing defining an axis, a magnetic plunger rod configured to transverse axially inside of the coil housing, a diaphragm assembly connected to the plunger rod at an end thereof, and an end cap having a side that presses against the coil housing to form a fluid tight seal.

The end cap further includes channels forming the fluid inlet and the fluid outlet, the end cap further forming an internal volume of the solenoid-operated valve. The inlet includes a raised sealing apex. The diaphragm assembly forms a fluid tight seal against the raised sealing apex when the solenoid-operated valve is in the shut position.

The raised sealing apex has a conical shape at an angle of approximately 45° degrees. The valve further comprises a valve seat about the axis and around an inner diameter of the end cap such that when the valve is in the shut position the diaphragm assembly seats on the valve seat and the raised sealing apex.

The internal volume is approximately equal to 17 µl in a preferred embodiment. The diaphragm assembly is connected to the plunger rod using an insert molding process. The inlet has a diameter of approximately 0.020 inches in a preferred embodiment.

The valve further comprises a bobbin disposed about the axis of the coil housing and defining an inner hollow section, the bobbin configured to fit inside of the coil housing, the bobbin and the coil housing together defining an outer hollow section. A solenoid coil is wrapped around the bobbin at the outer hollow section. A spring having a spring force is configured to fit in between an end of the bobbin and a rib protruding around a circumference of the plunger rod, wherein on an open half-cycle the solenoid coil is energized creating a magnetic field, the magnetic field forcing the plunger rod to transverse axially against the spring force and move the diaphragm assembly in a direction away from the inlet and the outlet allowing fluid to pass. On a closed half-cycle the solenoid coil is de-energized releasing the magnetic field allowing the spring force to move the diaphragm assembly in a reverse direction sealing the inlet and the outlet.

The valve further comprises a mag pin configured to fit inside of the bobbin, in the inner hollow section and adjacent to the plunger rod, an area separating the bobbin and the mag pin together defining an air gap when the solenoid-operated valve is in the shut position, and wherein the air gap has a magnitude designed for optimum performance. The air gap is approximately equal to 0.005 inches in a preferred embodiment. The mag pin has a position that is adjustable. The position controls flow amount, dispense volume, and dispense speed. The mag pin may be threaded to adjust the position. The mag pin may have threads which have a pitch length of approximately 0.025 inches, and a sharp apex having an angle of approximately 60° degrees.

The valve may further comprise a mag disc configured to fit around the mag pin at an end thereof, the mag disc configuration selected for optimum strength of the magnetic field and optimum performance of the valve. The valve further comprises one or more electrical leads mechanically connected to the bobbin and electrically connected to the solenoid coil.

The valve further comprises a manifold screw slidingly disposed over the end cap. The manifold screw is configured to engage a valve manifold. The coil housing has telescoping diameters. A first diameter is equal to a diameter of the manifold screw and a second diameter is equal to a diameter of the end cap.

The fluid internal to the valve that is not easily flushed out during a purge cycle defines a dead volume that is approximately equal to zero. This avoids the problem of carryover. The valve is designed for zero leakage past the diaphragm assembly. Thus, the solenoid-operated valve may preferably comprise an isolation valve.

During a dispense cycle, approximately 5 nano-liters to 5 µl of fluid may be passed by the valve in a preferred embodiment.

The coil housing may also have a diameter of approximately 0.250 inches in a preferred embodiment.

The valve may have a dispense speed designed to be approximately 10 msec in a preferred embodiment. The end cap may be composed of a chemically inert polymer, such as PEEK (Poly Ether Ether Ketone), while the plunger rod and the coil housing may be composed of 400-series stainless steel. The valve may be designed for low power consumption approximately equal to one (1) Watt.

The valve may further comprise a seal adjacent to the end cap for providing a fluid tight seal to a valve manifold. The seal may be composed of EPDM (Ethylene Propylene Diene Monomer) rubber material and wherein the seal has one or more built-in O-rings.

In another aspect, a solenoid-operated valve comprises a fluid inlet, a fluid outlet, a coil housing defining an axis, a solenoid coil disposed about the axis and configured to fit inside of the coil housing, the solenoid coil generating a magnetic field when energized, a magnetic plunger rod configured to transverse axially inside of the coil housing, wherein on an open half-cycle the plunger rod moves axially to unseat the valve, and wherein on a closed half-cycle the plunger rod moves in a reverse axial direction to seat the valve, and a mag pin. The mag pin and the plunger rod together define an air gap in between when the valve in a shut position. The mag pin is adjustable for adjustment of the air gap to provide control of flow amount, dispense volume and dispense speed.

The valve further comprises a diaphragm assembly connected to the plunger rod at an end thereof, and an end cap having a side that presses against the coil housing during assembly forming a fluid tight seal. The end cap has channels forming the inlet and the outlet, the end cap further forming an internal volume of the solenoid-operated valve, wherein the inlet has a raised sealing apex and the diaphragm assembly forms a fluid tight seal against the raised sealing apex when the solenoid-operated valve is in the shut position.

The raised sealing apex may have a conical shape at an angle of approximately 45° degrees. The valve may further comprise a valve seat about the axis and around an inner diameter of the end cap so that when the valve is in the shut position, the diaphragm assembly seats on the valve seat and the raised sealing apex.

The internal volume is approximately equal to 17 µl in a preferred embodiment. The diaphragm assembly is connected to the plunger rod using an insert molding process. The fluid inlet has a diameter of approximately 0.020 inches in a preferred embodiment.

The valve further comprises a bobbin defining an inner hollow section. The bobbin is configured to fit inside of the coil housing, the bobbin and coil housing together defining an outer hollow section. A solenoid coil is wrapped around the bobbin at the outer hollow section. A spring having a spring force is configured to fit in between an end of the bobbin and a rib protruding around a circumference of the plunger rod. On an open half-cycle, the solenoid coil is energized creating the magnetic field, the magnetic field forcing the plunger rod to transverse axially against the spring force and move the diaphragm assembly in a direction away from the inlet and the outlet allowing fluid to pass. On a closed half-cycle, the solenoid coil is de-energized releasing the magnetic field allowing the spring force to move the diaphragm assembly in a reverse direction sealing the inlet and the outlet.

The mag pin is configured to fit inside of the bobbin adjacent to the plunger rod in the inner hollow section. The air gap is approximately equal to 0.005 inches in a preferred embodiment. The mag pin may threaded to adjust the position.

The valve may further comprise a mag disc configured to fit around the mag pin at an end thereof. The mag disc configuration is chosen for optimum strength of the magnetic field and optimum performance of the valve. The valve may further comprise one or more electrical leads mechanically connected to the bobbin and electrically connected to the solenoid coil. The valve may further comprise a manifold screw slidingly disposed over the end cap. The manifold screw is configured to engage a valve manifold. The coil housing has telescoping diameters. A first diameter is equal to a diameter of the manifold screw. A second diameter is equal to a diameter of the end cap.

The fluid internal to the valve that is not easily flushed out during a purge cycle defines a dead volume that is approximately equal to zero.

The valve may be designed for zero leakage past the diaphragm assembly. The solenoid-operated valve may comprise an isolation valve.

During a dispense cycle, approximately 5 nano-liters to 5 µl of fluid may be passed.

The coil housing has a diameter of approximately 0.250 inches in a preferred embodiment. The valve may have a dispense speed designed to be approximately 10 msec in a preferred embodiment.

In a further aspect, a solenoid-operated valve comprises a fluid inlet, a fluid outlet, a coil housing defining an axis, a solenoid coil disposed about the axis and configured to fit inside of the coil housing, the solenoid coil creating a magnetic field when energized, and a magnetic plunger configured to transverse axially inside of the coil housing. On an open half-cycle, the plunger rod moves axially to unseat the valve. On a closed half-cycle, the plunger rod moves in a reverse axial direction to seat the valve. The coil housing preferably has a diameter of approximately 0.250 inches.

The valve further comprises a mag pin. The mag pin and the plunger rod together define an air gap in between when the valve is in a shut position. The mag pin is adjustable for adjustment of the air gap to provide control of flow amount, dispense volume and dispense speed.

The valve further comprises a diaphragm assembly connected to the plunger rod at an end thereof, and an end cap having a side that presses against the coil housing during assembly forming a fluid tight seal. The end cap has channels forming the inlet and the outlet, the end cap further forming an internal volume of the solenoid-operated valve, wherein the inlet has a raised sealing apex and the diaphragm assembly forms a fluid tight seal against the raised sealing apex when the solenoid-operated valve is in the shut position.

The raised sealing apex preferably has a conical shape at an angle of approximately 45° degrees.

The valve further comprises a valve seat about the axis and around an inner diameter of the end cap so that when the valve is in the shut position the diaphragm assembly seats on the valve seat and the raised sealing apex. The internal volume is preferably approximately equal to 17 µl. The diaphragm assembly is preferably connected to the plunger rod using an insert molding process. The fluid inlet preferably has a diameter of approximately 0.020 inches.

The valve further comprises a bobbin defining an inner hollow section. The bobbin is configured to fit inside of the coil housing. The bobbin and coil housing together define an outer hollow section. The solenoid coil is wrapped around the bobbin at the outer hollow section. A spring having a spring force is configured to fit in between an end of the bobbin and a rib protruding around a circumference of the plunger rod. On an open half-cycle, the solenoid coil is energized creating the magnetic field, the magnetic field forcing the plunger rod to transverse axially against the spring force and move the diaphragm assembly in a direction away from the inlet and the outlet allowing fluid to pass. On a closed half-cycle, the solenoid coil is de-energized releasing the magnetic field allowing the spring force to move the diaphragm assembly in a reverse direction sealing the inlet and the outlet.

The mag pin may be configured to fit inside of the bobbin adjacent to the plunger rod. The air gap is approximately equal to 0.005 inches in a preferred embodiment. The mag pin may be threaded to adjust the position.

The valve may further comprise a mag disc configured to fit around the mag pin at an end thereof. The mag disc configuration is chosen for optimum strength of the magnetic field and optimum performance of the valve.

The valve may further comprise a manifold screw slidingly disposed over the end cap, the manifold screw configured to engage a valve manifold. The coil housing has telescoping diameters. A first diameter is equal to the a diameter of the manifold screw and a second diameter is equal to a diameter of the end cap.

The fluid internal to the valve that is not easily flushed out during a purge cycle defines a dead volume that is approximately equal to zero.

The valve may be designed for zero leakage past the diaphragm assembly. The solenoid-operated valve may comprise an isolation valve.

During a dispense cycle, approximately 5 nano-liters to 5 µl of fluid may be passed in a preferred embodiment.

A method of making a solenoid-operated valve is also provided. The method comprises the steps of providing a coil housing defining an axis, disposing a solenoid actuated plunger rod within the coil housing allowing for axial movement of the plunger rod, providing an air gap adjacent to the solenoid actuated plunger rod, and setting the dispense volume of the pump by precisely setting the size of the air gap. The method further comprises providing a spring having a spring force configured axially with the plunger rod to assist axial movement of the plunger rod.

The method further comprises energizing the solenoid to induce a magnetic field along the axis, the spring force and the magnetic field configured to provide axial movement of the plunger rod when the magnetic field is alternated on and off. The method further comprises providing an end cap having a side, pressing the side of the end cap against the coil housing during assembly; and forming a fluid tight seal.

It is an object of the present invention to provide a solenoid-operated valve design and method particularly for small manufacture. It is another object of the present invention to provide a valve design for small dispense volumes, small internal volume, and fast operating speed. It is yet a further object of the present invention to provide a valve design particularly suited for a compact, high-density valve manifold. It is yet a further object of the present invention to provide a solenoid valve design for low power consumption. Another object of the present invention is to provide a solenoid-operated valve that is easy to manufacture, simple to use, and cost effective.

The term fluid used herein, is to mean any substance that can flow; liquid or gas.

These, as well as other advantages of the present invention, will be more apparent from the following description and drawings. It is understood that changes in the specific structure shown and described may be made within the scope of the claims, without departing from the spirit of the invention.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 is an isometric view of a first preferred solenoid-operated valve according to the present invention;

FIG. 2 is an isometric view of an exemplary valve manifold application according to the present invention;

FIG. 3 is a front-end view of the first preferred solenoid-operated valve according to the present invention;

FIG. 4 is a rear end view of the first preferred solenoid-operated valve according to the present invention;

FIG. 6 is a cross-sectional view of the first preferred valve according to the present invention taken along sectional line 6—6 of FIG. 4;

FIG. 7 is an enlarged view of a preferred end cap according to the present invention;

FIG. 8 is a further magnified view of the end cap illustrating a raised sealing apex according to the present invention.

DETAILED DESCRIPTION OF THE PREFERRED EMBODIMENTS

Figure 5:
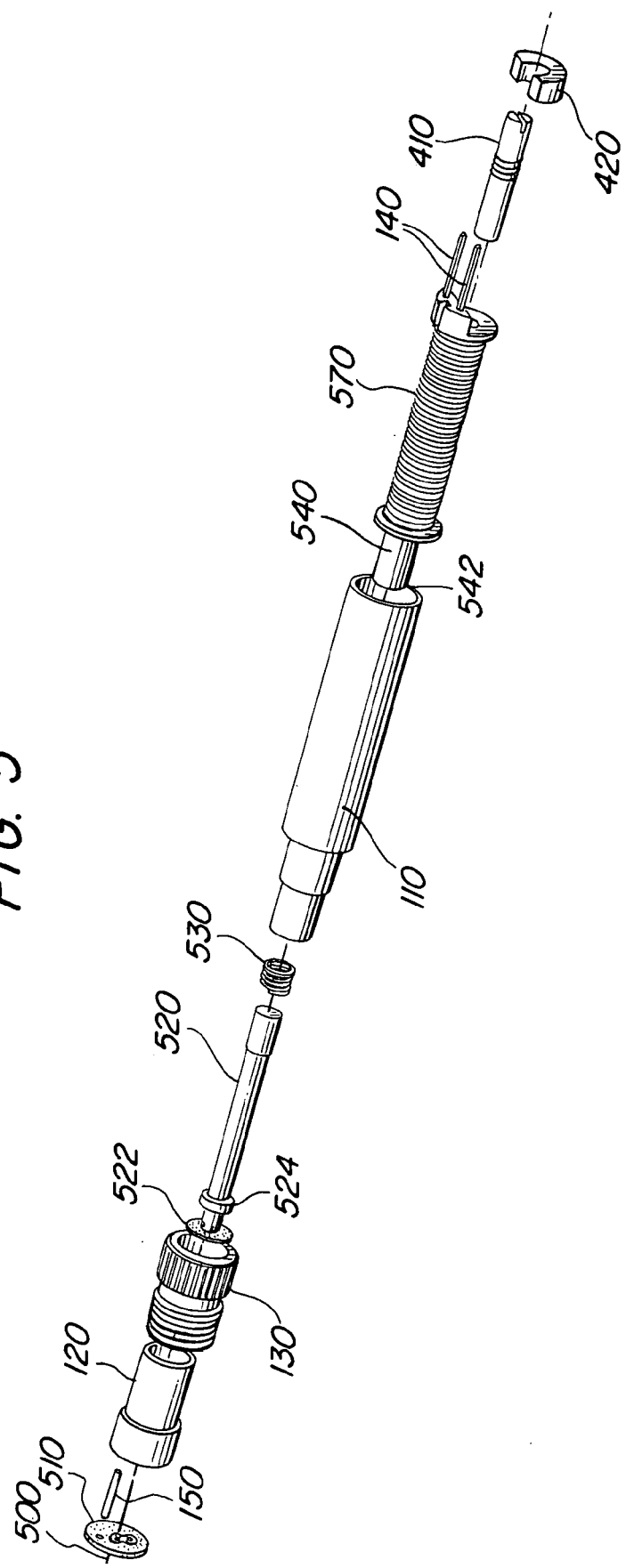
FIG. 5 is an exploded isometric view of individual components of a valve according to the present invention disposed about a center axis.

Referring initially to FIG. 1, a first preferred embodiment of a solenoid-operated valve 100 according to the present invention is shown. The valve 100 comprises external components including a coil housing 110 and an end cap 120. A manifold screw 130 partially surrounds portions of the coil housing 110 and the end cap 120. A rear end of the solenoid valve 100 includes electrical leads 140 that provide power to energize a solenoid coil 570 (FIG. 5). A locating pin 150 properly aligns valve inlet and outlet ports 160, 170 (FIG. 3), respectively, to a valve manifold 200.

FIG. 2 illustrates an isometric view of the exemplary valve manifold 200. The valve 100 is compact in design and ideal for the high-density valve manifold 200. The valve 100 require minimum space, approximately less than two (2) cubic inches, and has a small diameter approximately 0.25 inches mounting in a 0.28 inch cavity, for example. This allows many valves 100 to be used in close proximity resulting in a smaller fluidic platform. The manifold screw 130 has threads and the manifold 200 is configured to receive the threads.

Referring now to FIG. 3, a front-end view of the valve 100 is illustrated. In this example, the inlet port 160 is located in the center of valve 100 about its axis 500 (FIG. 5). The outlet port 170 is also termed the N.C. (normally closed) port. The valve 100 is a two-way isolation valve in that the valve 100 has two positions: open, and shut. In this example, the valve 100 is deenergized in the shut position.

FIG. 4 shows a rear end view of the valve 100, wherein a head portion of a mag pin 410 is illustrated. The mag pin 410 allows for adjustment of an air gap 650 (FIG. 6) that controls the dispense volume and dispense speed of the valve 100. Such adjustment is unique to solenoid-operated valves. An end portion of a mag disc 420 is also shown. The mag disc 420 shapes a magnetic flux field generated by the solenoid coil 570 when energized.

Now referring to FIG. 5, an exploded isometric view of individual components of the valve 100, disposed about center axis 500, is illustrated. A seal 510 is optionally employed to interface the inlet and outlet ports 160, 170 with the manifold 200. The seal 510 includes built-in O-rings for the inlet and outlet ports 160, 170 to eliminate the need for separate O-rings for each of the ports 160, 170. Preferably, the seal 510 is composed of EPDM (Ethylene Propylene Diene Monomer) rubber material, or other suitable material.

A plunger rod 520 is configured to reciprocate axially inside of the coil housing 110 when the valve 100 is cycled open and shut. Further, a diaphragm assembly 522 is located on an end of the plunger rod 520, and seats the inlet and outlet ports 160, 170 inside of the end cap 120. Preferably, the diaphragm assembly 522 is connected to the plunger rod 520 by an insert molding process. The diaphragm assembly 522 is made from suitable rubber material such as EPDM, for example. The plunger rod 520 includes a rib 524 protruding around a circumference thereof. Further, a spring 530 is located between the rib 524 and an end 542 of a bobbin 540, and the solenoid coil 570 is wrapped around the bobbin 540 as shown. The spring 530 provides a spring force to move the plunger rod 520 axially to shut the valve 100 when the solenoid coil 570 is deenergized. Preferably, the plunger rod 520 has a short design length to cause the valve 100 to operate quickly. The mag pin 410 further includes threads 910 (FIG. 9) for adjusting the air gap 650.

FIG. 6 illustrates a cross-sectional view of the valve 100, taken along sectional line 6—6 of FIG. 4. In this illustration, the air gap 650 is shown and determines how far the plunger rod 520 travels during a dispense cycle open and shut operation. The mag pin 410 can be operated by a user to adjust the magnitude of the air gap 650. The magnitude of air gap 650 is designed for full flow such that further increasing the magnitude of the air gap 650 does not increase the volumetric flow rate past the valve 100. In this manner, the valve 100 provides quick operation such that the diaphragm assembly 522 need not travel a great distance to provide full flow past the valve 100.

Preferably, the magnitude of the air gap 650 is e.g. approximately five (5) thousandths of an inch and a diameter of the inlet port 160 is e.g. approximately twenty (20) thousandths of an inch. Further, the magnitude of the air gap 650 is selected to be e.g. approximately one-quarter (¼) the design diameter of the inlet port 160. Such dimensions provide quick operating time an full flow with relatively short movement of the plunger rod 520, provide reduced power consumption of by the valve 100 and reduce unnecessary use of the solenoid coil 570 which can be relatively weak (e.g., one (1) Watt). Such a coil 570 is also beneficial in minimizing the effects of residual magnetism that will affect the dispense speed of valve 100. In a preferred embodiment, the valve 100 has a dispense speed of approximately 10 msec.

Also referring to FIG. 6, the bobbin 540 defines an inner hollow section that allows the plunger rod 520 to reciprocate axially. The coil housing 110 and the bobbin 540 together define an outer hollow section 630 that provides an area for the solenoid coil 570 to be wrapped around the bobbin 540. Preferably, the coil 570 is wrapped with coating or tape to prevent shorting. Additionally, the end cap 120 presses against the coil housing 110, forming a fluid tight junction therebetween. The portion of the end cap 120 and the coil housing 110 forming that junction are surrounded by the manifold screw 130 and provide a simple, time saving assembly procedure. To further enhance the compactness of the valve 100, the coil housing 110 has telescoping diameters so that the coil housing 110 can receive the end cap 120 during assembly, wherein the manifold screw 130 has an equal diameter to the outermost coil housing 110 diameter.

In an example operation of the valve 100, as illustrated in FIG. 6, the spring 530 exerts a linear spring force on the diaphragm 522 and seals the diaphragm 522 against a raised sealing apex 710 (FIGS. 7 and 8) of the end cap 120. Additionally, the valve 100 seats around an inner circumference of the end cap 120 to block the fluid path of the outlet 170 as desired for the particular application. The valve 100 is deenergized to shut and is normally closed. As those skilled in the art will recognize, a similar design embodied by the present invention can be a valve that is normally open.

A DC voltage pulse energizes the coil 570 and actuates valve 100. When the solenoid coil 570 is energized, it generates a magnetic flux field that causes the plunger rod 520 and the diaphragm assembly 522 to move to the right against the force of the spring 530 proximate the air gap 650 until the plunger rod 520 contacts the mag pin 410 which is in a fixed position. At this point, the diaphragm 522 is pulled away from the sealing apex 710 of the end cap 120 whereby the liquid or gas media flows through the inlet port 160 and out of the outlet port 170.

In a preferred embodiment, the mag screw 410, the plunger rod 520, the coil housing 110, and the mag disc 420 are made from 400-series stainless steel chosen for its magnetic properties and its ability to resist corrosion. The end cap 120 having channels that form the inlet and outlet ports 160, 170, is preferably composed of a chemically inert material, such as PEEK (Poly Ether Ether Ketone). Importantly, the valve 100 is designed for zero "dead volume" which conserves samples such as in medical applications, and provides ease of cleaning and flushing. It is also important to note that value 100 can be specifically employed in microfluidic applications. In a preferred embodiment, the valve 100 has a dispense volume of approximately five (5) nanoliters for one open/shut cycle, and an end cap 120 internal volume of approximately seventeen (17) microliters.

Now referring to FIG. 7, an enlarged view of the raised sealing apex 710 is shown. The diaphragm assembly 522 partially seats on the sealing apex 710 that is conical in shape to ensure a fluid tight seal over the inlet port 160. FIG. 8 illustrates another magnified view of the sealing apex 710 of the area encircled by line-8 in FIG. 7. In a preferred embodiment, the angle 810 is approximately 45° degrees.

Figure 9:
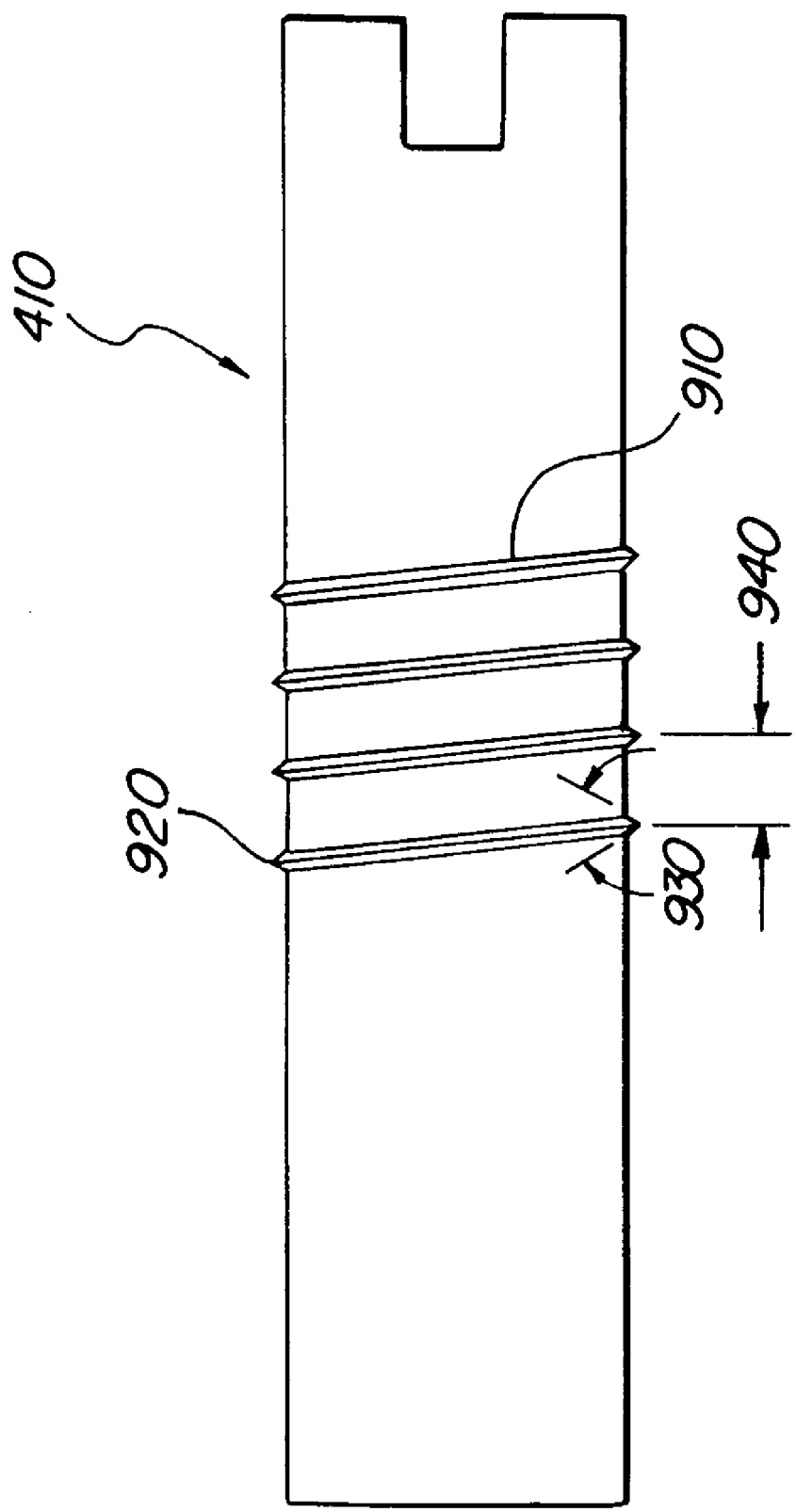
FIG. 9 is a side view of a preferred mag pin according to the present invention.

Referring to FIG. 9, a side view of the mag pin 410 is shown. In a preferred embodiment, the mag pin 410 has threads 910 that allow for the mag pin 410 to adjust the magnitude of the air gap 650. The threads 910 are further designed to have a sharp apex 920 forming a point. It is further preferred that the apex 920 forms an angle 930 of approximately 60° degrees. It is still further preferred that the pitch 940 of the threads 910 is approximately 0.025 inches.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

While the particular Micro-Mini Two-Way Isolation Valve as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed is:

1. A solenoid-operated valve, comprising:
   a fluid inlet;
   a fluid outlet;
   a coil housing defining an axis;
   a magnetic plunger rod configured to transverse axially inside of the coil housing;
   a diaphragm assembly connected to the plunger rod at an end thereof;
   an end cap having a side that presses against the coil housing to form a fluid tight seal; and
   a manifold screw slidingly disposed over the end cap, the manifold screw configured to engage a valve manifold.

2. The solenoid-operated valve of claim 1, wherein:
   the end cap further includes channels forming the fluid inlet and the fluid outlet, the end cap further forming an internal volume of the solenoid-operated valve,
   the inlet includes a raised sealing apex, and
   the diaphragm assembly forms a fluid tight seal against the raised sealing apex when the solenoid-operated valve is in the shut position.

3. The solenoid-operated valve of claim 2, wherein the raised sealing apex has a conical shape at an angle of approximately 45° degrees.

4. The solenoid-operated valve of claim 2, further comprising a valve seat about the axis and around an inner diameter of the end cap such that when the valve is in the shut position the diaphragm assembly seats on the valve seat and the raised sealing apex.

5. The solenoid-operated valve of claim 2, wherein the internal volume is approximately equal to 17 µl.

6. The solenoid-operated valve of claim 1, wherein the diaphragm assembly is connected to the plunger rod using an insert molding process.

7. The solenoid-operated valve of claim 1, wherein the inlet has a diameter of approximately 0.020 inches.

8. The solenoid-operated valve of claim 1, further comprising:
   a bobbin disposed about the axis of the coil housing and defining an inner hollow section, the bobbin configured to fit inside of the coil housing, the bobbin and the coil housing together defining an outer hollow section;
   a solenoid coil wrapped around the bobbin at the outer hollow section; and
   a spring having a spring force configured to fit in between an end of the bobbin and a rib protruding around a circumference of the plunger rod;
   wherein on an open half-cycle the solenoid coil is energized creating a magnetic field, the magnetic field forcing the plunger rod to transverse axially against the spring force and move the diaphragm assembly in a direction away from the inlet and the outlet allowing fluid to pass; and
   wherein on a closed half-cycle the solenoid coil is de-energized releasing the magnetic field allowing the spring force to move the diaphragm assembly in a reverse direction sealing the inlet and the outlet.

9. The solenoid-operated valve of claim 8, further comprising a mag pin configured to fit inside of the bobbin, in the inner hollow section and adjacent to the plunger rod, an area separating the bobbin and the mag pin together defining an air gap when the solenoid-operated valve is in the shut position, and wherein the air gap has a magnitude designed for optimum performance.

10. The solenoid-operated valve of claim 9, wherein the air gap is approximately equal to 0.005 inches.

11. The solenoid-operated valve of claim 8, further comprising one or more electrical leads mechanically connected to the bobbin and electrically connected to the solenoid coil.

12. The solenoid-operated valve of claim 1, wherein the coil housing has telescoping diameters, a first diameter being equal to a diameter of the manifold screw and a second diameter being equal to a diameter of the end cap.

13. The solenoid-operated valve of claim 1, wherein fluid internal to the valve that is not discharged during a dispense cycle defines a dead volume approximately equal to zero.

14. The solenoid-operated valve of claim 1, wherein the valve is designed for zero leakage past the diaphragm assembly and wherein the solenoid-operated valve is an isolation valve.

15. The solenoid-operated valve of claim 1, wherein during a dispense cycle, approximately 5 nano-liters of fluid is passed by the valve.

16. The solenoid-operated valve of claim 1, wherein the coil housing has a diameter of approximately 0.250 inches.

17. The solenoid-operated valve of claim 1, wherein the valve has a dispense speed designed to be approximately 10 msec.

18. The solenoid-operated valve of claim 1, wherein the end cap is composed of a chemically inert polymer and the plunger rod and the coil housing are composed of 400-series stainless steel.

19. The solenoid-operated valve of claim 1, wherein the valve is designed for low power consumption approximately equal to one (1) Watt.

20. The solenoid-operated valve of claim 1, further comprising a seal adjacent to the end cap for providing a fluid tight seal to a valve manifold.

21. The solenoid-operated valve of claim 20, wherein the seal is composed of EPDM (Ethylene Propylene Diene Monomer) rubber material and wherein the seal has one or more built-in O-rings.

22. A solenoid-operated valve, comprising:
a fluid inlet;
a fluid outlet;
a coil housing defining an axis;
a magnetic plunger rod configured to transverse axially inside of the coil housing;
a diaphragm assembly connected to the plunger rod at an end thereof;
an end cap having a side that presses against the coil housing to form a fluid tight seal;
a bobbin disposed about the axis of the coil housing and defining an inner hollow section, the bobbin configured to fit inside of the coil housing, the bobbin and the coil housing together defining an outer hollow section;
a solenoid coil wrapped around the bobbin at the outer hollow section;
a spring having a spring force configured to fit in between an end of the bobbin and a rib protruding around a circumference of the plunger rod; and
a mag pin configured to fit inside of the bobbin, in the inner hollow section and adjacent to the plunger rod, an area separating the bobbin and the mag pin together defining an air gap when the solenoid-operated valve is in the shut position, and wherein the air gap has a magnitude designed for optimum performance,
wherein on an open half-cycle the solenoid coil is energized creating a magnetic field, the magnetic field forcing the plunger rod to transverse axially against the spring force and move the diaphragm assembly in a direction away from the inlet and the outlet allowing fluid to pass,
wherein on a closed half-cycle the solenoid coil is de-energized releasing the magnetic field allowing the spring force to move the diaphragm assembly in a reverse direction sealing the inlet and the outlet, and
wherein the mag pin has a position that is adjustable, the position controlling flow amount, dispense volume, and dispense speed.

23. The solenoid-operated valve of claim 22, wherein the mag pin is threaded to adjust the position.

24. A solenoid-operated valve, comprising:
a fluid inlet;
a fluid outlet;
a coil housing defining an axis;
a magnetic plunger rod configured to transverse axially inside of the coil housing;
a diaphragm assembly connected to the plunger rod at an end thereof;
an end cap having a side that presses against the coil housing to form a fluid tight seal;
a bobbin disposed about the axis of the coil housing and defining an inner hollow section, the bobbin configured to fit inside of the coil housing, the bobbin and the coil housing together defining an outer hollow section;
a solenoid coil wrapped around the bobbin at the outer hollow section;
a spring having a spring force configured to fit in between an end of the bobbin and a rib protruding around a circumference of the plunger rod; and
a mag pin configured to fit inside of the bobbin, in the inner hollow section and adjacent to the plunger rod, an area separating the bobbin and the mag pin together defining an air gap when the solenoid-operated valve is in the shut position, and wherein the air gap has a magnitude designed for optimum performance,
wherein on an open half-cycle the solenoid coil is energized creating a magnetic field, the magnetic field forcing the plunger rod to transverse axially against the spring force and move the diaphragm assembly in a direction away from the inlet and the outlet allowing fluid to pass, and
wherein on a closed half-cycle the solenoid coil is de-energized releasing the magnetic field allowing the spring force to move the diaphragm assembly in a reverse direction sealing the inlet and the outlet, and
wherein the mag pin has threads, the threads having a pitch length of approximately 0.025 inches, and wherein the threads have a sharp apex, the sharp apex having an angle of approximately 60° degrees.

25. A solenoid-operated valve, comprising:
a fluid inlet;
a fluid outlet;
a coil housing defining an axis;
a magnetic plunger rod configured to transverse axially inside of the coil housing;
a diaphragm assembly connected to the plunger rod at an end thereof;
an end cap having a side that presses against the coil housing to form a fluid tight seal;
a bobbin disposed about the axis of the coil housing and defining an inner hollow section, the bobbin configured to fit inside of the coil housing, the bobbin and the coil housing together defining an outer hollow section;
a solenoid coil wrapped around the bobbin at the outer hollow section;
a spring having a spring force configured to fit in between an end of the bobbin and a rib protruding around a circumference of the plunger rod;
a mag pin configured to fit inside of the bobbin, in the inner hollow section and adjacent to the plunger rod, an area separating the bobbin and the mag pin together defining an air gap when the solenoid-operated valve is in the shut position, and wherein the air gap has a magnitude designed for optimum performance; and
a mag disc configured to fit around the mag pin at an end thereof, the mag disc configuration selected for optimum strength of the magnetic field and optimum performance of the valve,
wherein on an open half-cycle the solenoid coil is energized creating a magnetic field, the magnetic field forcing the plunger rod to transverse axially against the spring force and move the diaphragm assembly in a direction away from the inlet and the outlet allowing fluid to pass, and
wherein on a closed half-cycle the solenoid coil is de-energized releasing the magnetic field allowing the spring force to move the diaphragm assembly in a reverse direction sealing the inlet and the outlet.

26. A solenoid-operated valve, comprising:
a fluid inlet;
a fluid outlet;
a coil housing defining an axis;
a solenoid coil disposed about the axis and configured to fit inside of the coil housing, the solenoid coil generating a magnetic field when energized;
a magnetic plunger rod configured to transverse axially inside of the coil housing, wherein on an open half-cycle the plunger rod moves axially to unseat the valve, and wherein on a closed half-cycle the plunger rod moves in a reverse axial direction to seat the valve;
a mag pin, wherein the mag pin and the plunger rod together define an air gap in between when the valve in a shut position, and wherein the mag pin is adjustable for adjustment of the air gap to provide control of flow amount, dispense volume and dispense speed;
a diaphragm assembly connected to the plunger rod at an end thereof;
an end cap having a side that presses against the coil housing during assembly forming a fluid tight seal; and
a manifold screw slidingly disposed over the end cap, the manifold screw configured to engage a valve manifold.

27. The solenoid-operated valve of claim 26, wherein the end cap has channels forming the inlet and the outlet, the end cap further forming an internal volume of the solenoid-operated valve, wherein the inlet has a raised sealing apex and the diaphragm assembly forms a fluid tight seal against the raised sealing apex when the solenoid-operated valve is in the shut position.

28. The solenoid-operated valve of claim 27, wherein the raised sealing apex has a conical shape at an angle of approximately 45° degrees.

29. The solenoid-operated valve of claim 26, further comprising a valve seat about the axis and around an inner diameter of the end cap so that when the valve is in the shut position the diaphragm assembly seats on the valve seat and the raised sealing apex.

30. The solenoid-operated valve of claim 27, wherein the internal volume is approximately equal to 17 µl.

31. The solenoid-operated valve of claim 26, wherein the diaphragm assembly is connected to the plunger rod using an insert molding process.

32. The solenoid-operated valve of claim 26, wherein the fluid inlet has a diameter of approximately 0.020 inches.

33. The solenoid-operated valve of claim 26, wherein the air gap is approximately equal to 0.005 inches.

34. The solenoid-operated valve of claim 26, wherein the mag pin is threaded to adjust the position.

35. The solenoid-operated valve of claim 26, further comprising a mag disc configured to fit around the mag pin at an end thereof, the mag disc configuration chosen for optimum strength of the magnetic field and optimum performance of the valve.

36. The solenoid-operated valve of claim 26, wherein the coil housing has telescoping diameters, a first diameter being equal to a diameter of the manifold screw and a second diameter being equal to a diameter of the end cap.

37. The solenoid-operated valve of claim 26, wherein fluid internal to the valve that is not discharged during a dispense cycle defines a dead volume, the dead volume approximately equal to zero.

38. The solenoid-operated valve of claim 26, wherein the valve is designed for zero leakage past the diaphragm assembly and wherein the solenoid-operated valve is an isolation valve.

39. The solenoid-operated valve of claim 26, wherein during a dispense cycle approximately 5 nano-liters of fluid is passed.

40. The solenoid-operated valve of claim 26, wherein the coil housing has a diameter of approximately 0.250 inches.

41. The solenoid-operated valve of claim 26, wherein the valve has a dispense speed designed to be approximately 10 msec.

42. A solenoid-operated valve, comprising:
a fluid inlet;
a fluid outlet;
a coil housing defining an axis;
a solenoid coil disposed about the axis and configured to fit inside of the coil housing, the solenoid coil generating a magnetic field when energized;
a magnetic plunger rod configured to transverse axially inside of the coil housing, wherein on an open half-cycle the plunger rod moves axially to unseat the valve, and wherein on a closed half-cycle the plunger rod moves in a reverse axial direction to seat the valve;
a mag pin, wherein the mag pin and the plunger rod together define an air gap in between when the valve in a shut position, and wherein the mag pin is adjustable for adjustment of the air gap to provide control of flow amount, dispense volume and dispense speed;
a bobbin defining an inner hollow section, the bobbin configured to fit inside of the coil housing, the bobbin and coil housing together defining an outer hollow section;
a solenoid coil wrapped around the bobbin at the outer hollow section; and
a spring having a spring force configured to fit in between an end of the bobbin and a rib protruding around a circumference of the plunger rod;
wherein on an open half-cycle the solenoid coil is energized creating the magnetic field, the magnetic field forcing the plunger rod to transverse axially against the spring force and move the diaphragm assembly in a direction away from the inlet and the outlet allowing fluid to pass; and
wherein on a closed half-cycle the solenoid coil is de-energized releasing the magnetic field allowing the spring force to move the diaphragm assembly in a reverse direction sealing the inlet and the outlet.

43. The solenoid-operated valve of claim 42, wherein the mag pin is configured to fit inside of the bobbin adjacent to the plunger rod in the inner hollow section.

44. The solenoid-operated valve of claim 42, further comprising one or more electrical leads mechanically connected to the bobbin and electrically connected to the solenoid coil.

45. A solenoid-operated valve, comprising:
a fluid inlet;
a fluid outlet;
a coil housing defining an axis;
a solenoid coil disposed about the axis and configured to fit inside of the coil housing, the solenoid coil creating a magnetic field when energized;
a magnetic plunger configured to transverse axially inside of the coil housing, wherein on an open half-cycle the plunger rod moves axially to unseat the valve, and wherein on a closed half-cycle the plunger rod moves in a reverse axial direction to seat the valve;
a diaphragm assembly connected to the plunger rod at an end thereof;
an end cap having a side that presses against the coil housing during assembly forming a fluid tight seal; and a manifold screw slidingly disposed over the end cap, the manifold screw configured to engage a valve manifold, wherein the coil housing has a diameter of approximately 0.250 inches.

46. The solenoid-operated valve of claim 45, further comprising a mag pin, wherein the mag pin and the plunger rod together define an air gap in between when the valve is in a shut position, and wherein the mag pin is adjustable for adjustment of the air gap to provide control of flow amount, dispense volume and dispense speed.

47. The solenoid-operated valve of claim 45, wherein the end cap has channels forming the inlet and the outlet, the end cap further forming an internal volume of the solenoid-operated valve, wherein the inlet has a raised sealing apex and the diaphragm assembly forms a fluid tight seal against the raised sealing apex when the solenoid-operated valve is in the shut position.

48. The solenoid-operated valve of claim 47, wherein the raised sealing apex has a conical shape at an angle of approximately 45° degrees.

49. The solenoid-operated valve of claim 45, further comprising a valve seat about the axis and around an inner diameter of the end cap so that when the valve is in the shut position the diaphragm assembly seats on the valve seat and the raised sealing apex.

50. The solenoid-operated valve of claim 47, wherein the internal volume is approximately equal to 17 μl.

51. The solenoid-operated valve of claim 45, wherein the diaphragm assembly is connected to the plunger rod using an insert molding process.

52. The solenoid-operated valve of claim 45, the fluid inlet having a diameter of approximately 0.020 inches.

53. The solenoid-operated valve of claim 45, further comprising:
 a bobbin defining an inner hollow section, the bobbin configured to fit inside of the coil housing, the bobbin and coil housing together defining an outer hollow section, the solenoid coil wrapped around the bobbin at the outer hollow section; and
 a spring having a spring force configured to fit in between an end of the bobbin and a rib protruding around a circumference of the plunger rod;
 wherein on an open half-cycle the solenoid coil is energized creating the magnetic field, the magnetic field forcing the plunger rod to transverse axially against the spring force and move the diaphragm assembly in a direction away from the inlet and the outlet allowing fluid to pass; and
 wherein on a closed half-cycle the solenoid coil is de-energized releasing the magnetic field allowing the spring force to move the diaphragm assembly in a reverse direction sealing the inlet and the outlet.

54. The solenoid-operated valve of claim 53, wherein the mag pin is configured to fit inside of the bobbin adjacent to the plunger rod.

55. The solenoid-operated valve of claim 46, wherein the air gap is approximately equal to 0.005 inches.

56. The solenoid-operated valve of claim 46, wherein the mag pin is threaded to adjust the position.

57. The solenoid-operated valve of claim 46, further comprising a mag disc configured to fit around the mag pin at an end thereof, the mag disc configuration chosen for optimum strength of the magnetic field and optimum performance of the valve.

58. The solenoid-operated valve of claim 45, wherein the coil housing has telescoping diameters, a first diameter being equal to the a diameter of the manifold screw and a second diameter being equal to a diameter of the end cap.

59. The solenoid-operated valve of claim 45, wherein fluid internal to the valve that is not discharged during a dispense cycle defines a dead volume, the dead volume approximately equal to zero.

60. The solenoid-operated valve of claim 45, wherein the valve is designed for zero leakage past the diaphragm assembly and wherein the solenoid-operated valve is an isolation valve.

61. The solenoid-operated valve of claim 45, wherein during a dispense cycle approximately 5 nano-liters of fluid is passed.

* * * * *